United States Patent [19]

Sakamoto

[11] Patent Number: 5,532,531
[45] Date of Patent: Jul. 2, 1996

[54] PERMANENT MAGNET TYPE BRUSHLESS MOTOR

[75] Inventor: Masafumi Sakamoto, Gunma, Japan

[73] Assignee: Japan Servo Co., Ltd., Tokyo, Japan

[21] Appl. No.: 327,857

[22] Filed: Oct. 24, 1994

[30] Foreign Application Priority Data

Nov. 1, 1993 [JP] Japan ................................. 5-293796

[51] Int. Cl.$^6$ ............................ H02K 37/14; H02K 37/08
[52] U.S. Cl. ............................... 310/49 R; 310/156
[58] Field of Search .......................... 310/49 R, 67 R, 310/156, 187

[56] References Cited

U.S. PATENT DOCUMENTS

| | | | |
|---|---|---|---|
| 5,289,064 | 2/1994 | Sakamoto | 310/49 R |
| 3,860,843 | 1/1975 | Kawasaki et al. | 310/67 R |
| 4,672,253 | 6/1987 | Tajima et al. | 310/49 R |
| 5,030,864 | 7/1991 | Van Hout et al. | 310/67 R |
| 5,334,894 | 8/1994 | Nakagawa et al. | 310/49 R |
| 5,386,161 | 1/1995 | Sakamoto | 310/49 R |
| 5,418,414 | 5/1995 | Ackermann et al. | 310/156 |

FOREIGN PATENT DOCUMENTS

282830  11/1979  Germany ................................. 310/156

Primary Examiner—Thomas M. Dougherty
Attorney, Agent, or Firm—Nilles & Nilles

[57] ABSTRACT

A permanent magnet type brushless motor wherein the number of a stator magnetic poles is 3 m (where m is an integer not less than 2), Z pieces of N pole and Z pieces of S pole (where Z is m (3n±1), and n is an integer not less than 2) are magnetized alternately with the same pitch, and an angle formed between a center of N pole of the permanent magnet corresponding to a pole tooth at the center of any one of the stator magnetic poles and a center of S pole of the permanent magnet corresponding to a pole tooth at the center of one of the stator magnetic poles adjacent to the any one of the stator magnetic poles is 360° (n±½)/Z.

11 Claims, 7 Drawing Sheets

5,532,531

PERMANENT MAGNET TYPE BRUSHLESS MOTOR

BACKGROUND OF THE INVENTION

1. Field of the Invention

This invention relates to a permanent magnet type brushless motor and, more particularly, relates to an improvement of a brushless motor, such as a permanent magnet type stepping motor having a back yoke.

2. Description of the Prior Art

FIG. 1 and FIG. 2 show a conventional brushless motor, such as a three-phase six-pole type hybrid stepping motor.

Reference numeral 1 denotes a cylindrical stator. Numerals 1-1~1-6 are six stator magnetic poles extending inwardly from the inner peripheral surface of said stator 1, each of said stator magnetic poles having three pole teeth, for example, on the tip thereof. Numerals 1'-1~1'-6 are six stator exciting windings each wound around each of said stator magnetic poles 1-1~1-6, respectively. Numerals 2, 2 are two rotors separated axially from each other, the outer peripheral surface of each rotor 2 facing the inner peripheral surfaces of the pole teeth of said stator magnetic poles 1-1~1-6 with a gap therebetween. Each rotor 2 has rotor pole teeth 3 on the outer peripheral surfaces thereof.

Reference numeral 4 is a permanent magnet held between said two rotors 2, 2 and magnetized into two poles in the axial direction thereof, and 5 is a rotary shaft.

In the conventional three-phase six-pole type brushless motor, the center lines of the pole teeth 3, 3 of said two rotors 2, 2 are deviated in the circumferential direction of said rotors by ½ pitch from each other.

Said stator exciting windings 1'-1 and 1'-4 form a first group for three-phase, 1'-2 and 1'-5 form a second group for three-phase and 1'-3 and 1'-6 form a third group for three-phase.

FIG. 3 shows a two-phase craw-pole permanent magnet type brushless motor. In this motor, a cylindrical permanent magnet 6 magnetized into two poles N and S alternately in the circumferential direction thereof is used as the rotor. A craw-pole 7 in the form of comb formed by pressing an iron plate is used as the stator magnetic pole. An annular winding 8 wound around a bobbin is used as the stator exciting winding.

In the conventional motor shown in FIGS. 1 and 2, however, ① the stator pole teeth are of convex type, and ② N pole and S pole of rotor are separated from each other in the axial direction thereof, and accordingly the waveform of the field magnetic flux becomes different from the sine waveform and has higher harmonic waves, so that the motor is oscillated when it is rotated.

Further, in said conventional motor, the path of magnetic flux is formed not only in the circumferential direction thereof but also in the axial direction thereof (iron core laminated direction), because N pole and S pole are separated from each other in the axial direction thereof, so that the magnetic resistance becomes high and the magnetic path is formed in the complicated three-dimensional direction. Furthermore, about one half of the whole outer peripheral surface area of the rotor is occupied by concave portions, so that the surface area of the rotor facing the stator becomes small, because convex rotor pole teeth are formed on the outer peripheral surface of the rotor. Accordingly, in said conventional motor, a rapid response cannot be attained.

In the conventional motor shown in FIG. 3, the mechanical precision thereof becomes low, because the rotor is formed by pressing an iron plate and the path of magnetic flux thereof is formed in the complicated three-dimentional direction. Accordingly, it is necessary to form the air gap three or four times larger than that of the hybrid type motor, so that the efficiency thereof becomes low.

SUMMARY OF THE INVENTION

An object of the present invention is to provide a permanent magnet type brushless motor which eliminates the above defects.

Another object of the present invention is to provide a permanent magnet type brushless motor comprising a cylindrical stator, 3 m pieces of stator magnetic pole (where m is an integer not less than 2) extending inwardly in the radial direction from the inner peripheral surface of said stator, each of said stator magnetic poles having a plurality of pole teeth on the tip thereof, stator exciting windings each wound around on each of the stator magnetic poles, a cylindrical permanent magnet facing the inner peripheral surfaces of said pole teeth of the stator magnetic poles with a gap therebetween, a back yoke of magnetic material intimately attached on the inner peripheral surface of said permanent magnet, and a rotary shaft for supporting said back yoke, characterized in that said permanent magnet have Z pieces of N pole and Z pieces of S pole magnetized alternately around the circumference thereof with the same pitch, where Z is m (3n±1), and n is an integer not less than 2, and an angle formed between the center of N pole of said permanent magnet corresponding to a pole tooth at the center of any one of said stator magnetic poles and the center of S pole of said permanent magnet corresponding to a pole tooth at the center of one of said stator magnetic poles adjacent to said any one of the stator magnetic poles is so determined that a magnetic flux from said N pole of said permanent magnet is passed through said stator magnetic pole corresponding to said N pole and returned to said S pole through said one of the stator magnetic poles adjacent to said any one of the stator magnetic poles.

Further object of the present invention is to provide a permanent magnet type brushless motor comprising a cylindrical stator, 3 m pieces of stator magnetic pole (where m is an integer not less than 2) extending outwardly in the radial direction from the outer peripheral surface of said stator, each of said stator magnetic poles having a plurality of pole teeth on the tip thereof, two of said stator magnetic poles being connected back to back with each other to form a stator leg, stator exciting windings each wound around on each of the stator legs, a cylindrical permanent magnet facing the outer peripheral surface of said pole teeth of the stator magnetic poles with a gap therebetween, a back yoke of magnetic material intimately attached on the outer peripheral surface of said permanent magnet, and a rotary shaft for supporting said back yoke, characterized in that said permanent magnet have Z pieces of N pole and Z pieces of S pole, said N pole and S pole are magnetized alternately around the circumference thereof with the same pitch, where Z is m (3n±1), and n is an integer not less than 2, and an angle formed between the center of N pole of said permanent magnet corresponding to a pole tooth at the center of any one of said stator magnetic poles and the center of S pole of said permanent magnet corresponding to a pole tooth at the center of one of said stator magnetic poles adjacent to said any one of said stator magnetic poles is so determined that a magnetic flux from said N pole of said permanent magnet is passed through said stator magnetic pole corresponding to said N pole and returned to said S pole through said one of the stator magnetic poles adjacent to said any one of the stator magnetic poles.

Yet further object of the present invention is to provide a a permanent magnet type brushless motor comprising a planar stator, 3 m pieces of stator magnetic pole (where m is an integer) extending outwardly in the radial direction on said stator, each of said stator magnetic poles having at one side surface thereof a plurality of pole teeth projected axially, stator exciting windings each wound around on each of the stator magnetic poles, an annular permanent magnet, one side surface of which is faced to side surfaces of said pole teeth of the stator magnetic poles with a gap therebetween, a back yoke of magnetic material intimately attached on the other surface of said permanent magnet, and a rotary shaft for supporting said back yoke, characterized in that said permanent magnet have Z pieces of N pole and Z pieces of S pole, said N pole and S pole are magnetized alternately around circumference thereof with the same pitch, where Z is (3n±1), and n is an integer not less than 2, and an angle formed between the center of N pole of said permanent magnet corresponding to a pole tooth at the center of any one of said stator magnetic poles and the center of S pole of said permanent magnet corresponding to a pole tooth at the center of one of said stator magnetic poles adjacent to said any one of said stator magnetic poles is so determined that a magnetic flux from said N pole of said permanent magnet is passed through said stator magnetic poles corresponding to said N pole and returned to said S pole through said one of stator magnetic poles adjacent to said any one of the stator magnetic pole.

Said angle can be defined by $360° (n\pm\frac{1}{2})/Z$.

DESCRIPTION OF THE PREFERRED EMBODIMENTS

An embodiment of this invention will be explained with reference to FIGS. 4 and 5.

Figure 10:
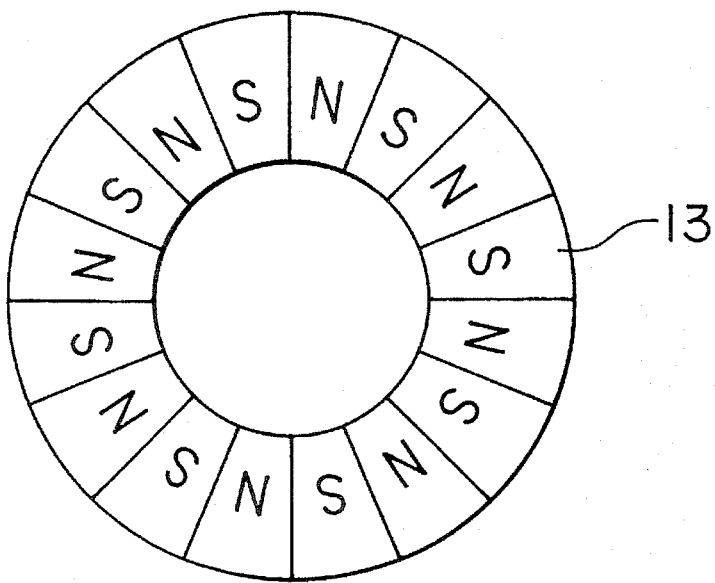
FIG. 10 is a view explaining a permanent magnet of the brushless motor shown in FIG. 8.
Figure 1:
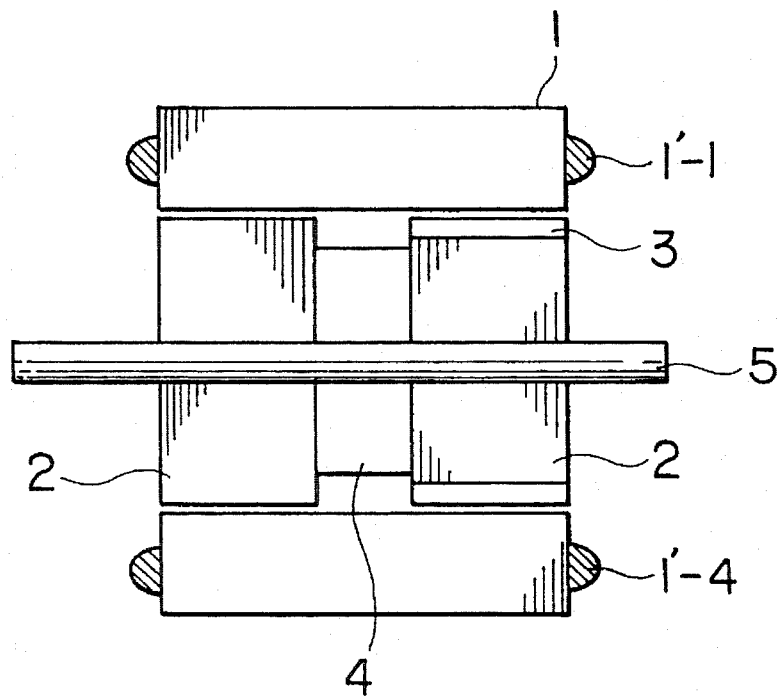
FIG. 1 is a vertically sectional side view of a conventional permanent magnet type brushless motor.
Figure 2:
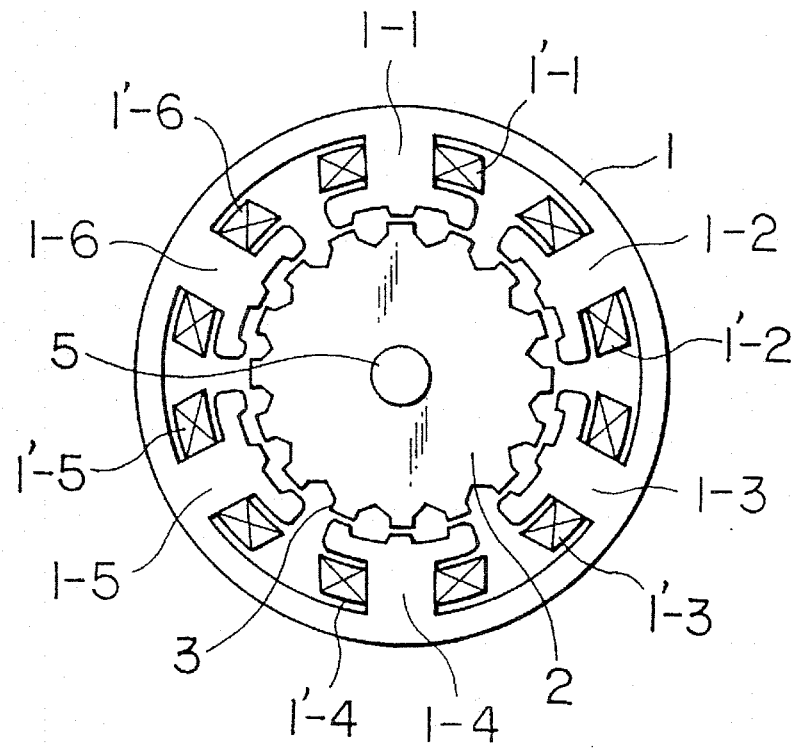
FIG. 2 is a front view of the conventional permanent magnet type brushless motor.
Figure 3:
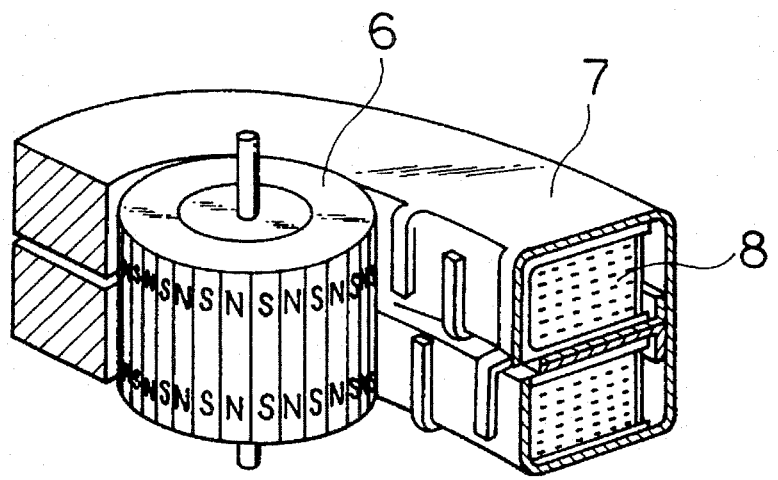
FIG. 3 is a perspective view of another conventional permanent magnet type brushless motor.
Figure 4:
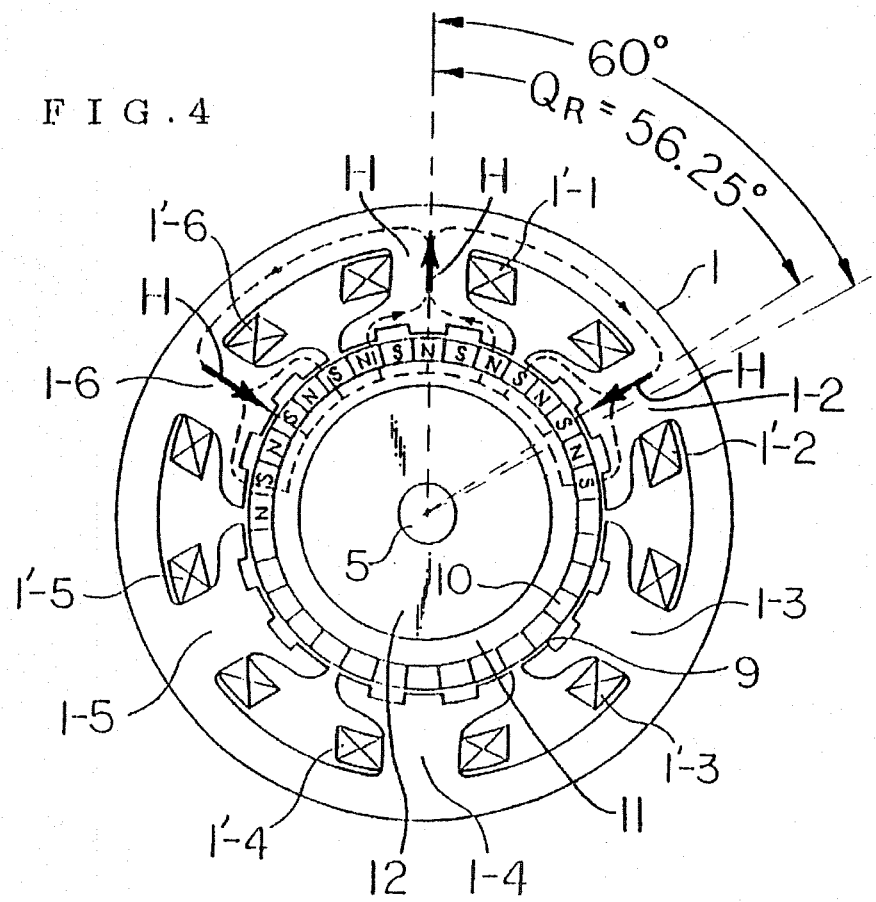
FIG. 4 is a front view of a permanent magnet type brushless motor of the present invention.
Figure 5:
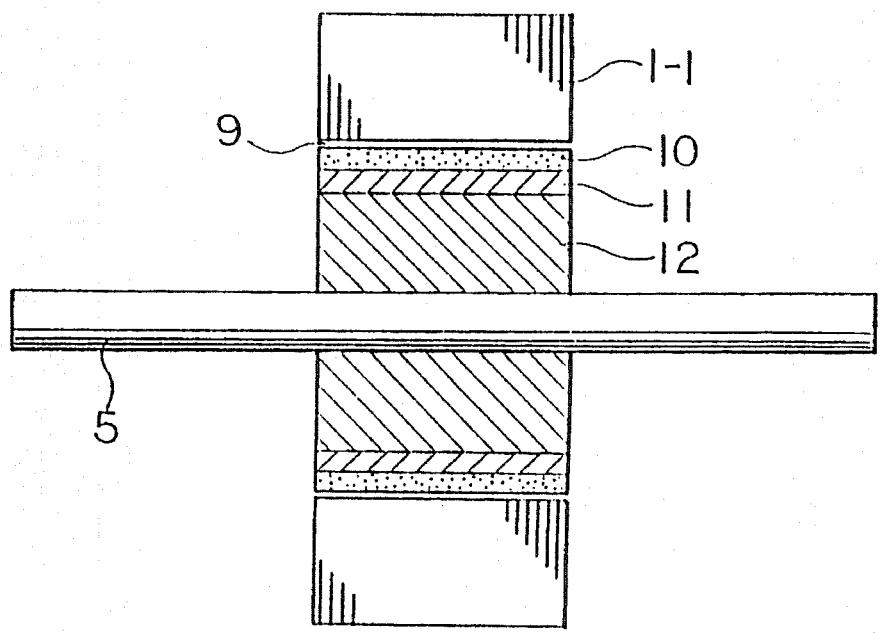
FIG. 5 is a vertically sectional side view of the permanent magnet type brushless motor of the present invention.

In FIGS. 4 and 5, the parts of the brushless motor of the present invention which are similar to corresponding parts of the prior art brushless motor shown in FIGS. 1 and 2 have been given corresponding reference numerals and need not be further redescribed.

In the brushless motor of the present invention, as shown in FIGS. 4 and 5, the inner peripheral surfaces of 3 m pieces of stator magnetic pole (where m is an integer not less than 2), for example, six stator magnetic poles (m=2) 1-1~1-6, each having a plurality of, for example, three pole teeth on the tip thereof are faced to the outer peripheral surface of a cylindrical thin permanent magnet 10 with an air gap 9 therebetween. A cylindrical thin back yoke 11 of ferromagnetic material is intimately attached on the inner peripheral surface of said permanent magnet 10, and the inner peripheral surface of said back yoke 11 is supported through a suitable stay 12 by a rotary shaft 5.

Said permanent magnet 10 has Z pieces of N pole, for example, sixteen N poles and Z pieces of S pole, for example, sixteen S poles, where Z is m (3n±1), and n is an integer not less than 2. Said N pole and S pole are magnetized alternately around the circumference of the present magnet 10 with the same pitch. An angle $Q_R$ formed between the center of N pole of said permanent magnet 10 corresponding to a pole tooth at the center of any one of said stator magnetic poles, such as the stator magnetic pole 1-1 and the center of S pole of said permanent magnet 10 corresponding to a pole tooth at the center of one of said stator magnetic poles, such as the stator magnetic pole 1-2 or 1-6 adjacent to said stator magnetic pole 1-1 is so determined as $360° (n\pm\frac{1}{2})/Z$. (Hence, the angle $Q_R$ is an angle between an N pole and an S pole of the permanent magnet 10, and not an angle between two stator magnetic pole teeth. For example, in the embodiment of FIG. 4 (in which the formula $Q_R=(n-\frac{1}{2})/Z$ applies), the angle $Q_R$ is equal to 56.25°, and not to 60° (which is the angle between the centers of the center pole teeth of stator magnetic poles 1-1 and 1-2)).

According to the permanent magnet type brushless motor of the present invention, when the center line of a pole tooth formed at the center of any one of said stator magnetic poles 1-1, for example is in alignment with the center line of any pole, for example N pole of said permanent magnet 10, a pole tooth at the center of the other stator magnetic pole 1-2 or 1-6 adjacent to said stator magnetic pole 1-1 faces to S pole of said permanent magnet 10, so that a magnetic path is formed between said stator magnetic poles 1-1 and 1-2, and 1-1 and 1-6 through the back yoke 11, respectively.

Specifically, the magnetic flux from N pole of the permanent magnet 10 is divided into rightward and leftward directions after passing through the air gap 9 and the pole tooth of the stator magnetic pole 1-1 facing said N pole, and extending across the exciting winding 1'-1, as shown by broken lines in FIG. 4. The magnetic flux in the leftward direction returns to said N pole through the pole tooth of the stator magnetic pole 1-6, the air gap 9, S pole of the permanent magnet 10 facing the stator magnetic pole 1-6, and the back yoke 11 inside of the permanent magnet 10, while extending across the exciting winding 1'-6.

Similarly, the magnetic flux in the rightward direction returns to said N pole through the pole tooth of the stator magnetic pole 1-2, the air gap 9, S pole of the permanent magnet 10 facing the stator magnetic pole 1-2, and the back yoke 11, while extending across the exciting winding 1'-2.

In said embodiment, m is 2, n is 3 and accordingly Z is 16, and $Q_R$ is 56.25°. The step angle is (360°/3 m)−$Q_R$, that is, 3.75°.

A neodymium-iron-boron magnet is suitable for the permanent magnet 10 in view of the cost and performance. In order to reduce the inertia of rotor, a bond magnet formed by bonding powders of the neodymium-iron-boron magnet with plastic material is preferable. Further, it is enough that the thickness of the permanent magnet 10 in the radial direction thereof is so determined that N poles and S poles can be magnetized in the circumferential diretion thereof, in consideration of the back yoke 11 to be provided on the inner peripheral surface of the permanent magnet 10. Specifically, it is enough practically that the thickness of the permanent magnet 10 is below a value of $\pi D/2Z$, because the width of the magnetic pole of the permanent magnet 10 in the circumferential direction thereof is $\pi D/2Z$, where D is the outer diameter of the permanent magnet 10.

Figure 6:
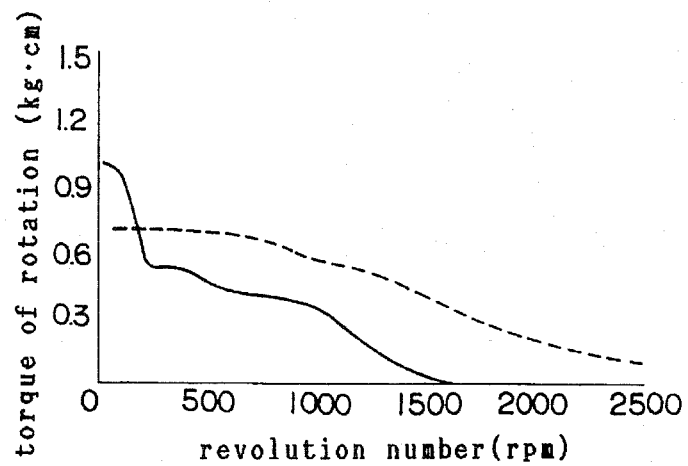
FIG. 6 is a diagram showing a property of the permanent magnet type brushless motor of the present invention.
Figure 7A:
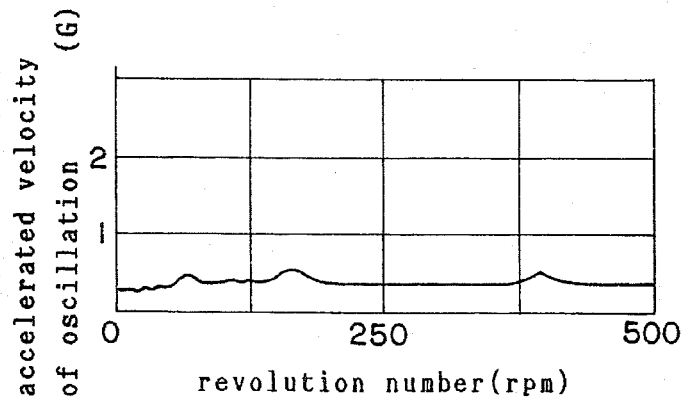
FIG. 7A is a diagram showing a property of the permanent magnet type brushless motor of the present invention.

FIG. 6 shows a broken line curve of torque of rotation-revolution number of the brushless motor according to the present invention, of which the three dimentions are 42 mm×42 mm×40 mm, the inner diameter of the stator is 26 mm, and Z is 16, and a solid line curve of torque of rotation-revolution number according to the conventional hybrid type brushless motor of the same conditions. FIG. 7A shows a curve of accelerated volocity of oscillation-revolution number of the brushless motor according to the present invention, whereas FIG. 7B shows a curve of acceleration volocity of oscillation-revolution number according to the conventional hybrid type brushless motor.

Figure 7B:
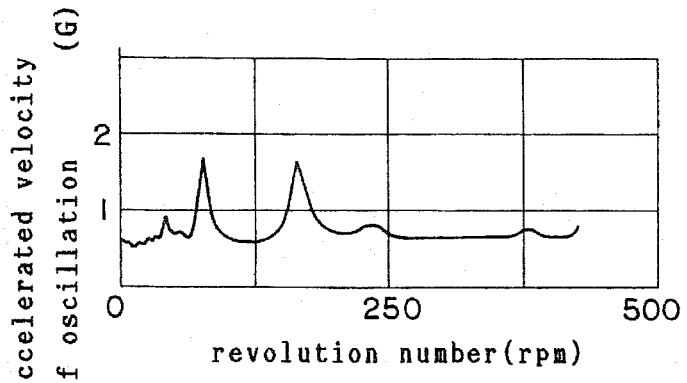
FIG. 7B is a diagram showing a property of the conventional hybrid brushless motor.

FIGS. 6, 7A and 7B show the fact that the torque of rotation in the high speed rnge of the brushless motor of the present invention is larger than that of the conventional motor, and that the curve of the torque of rotation-revolution number of the motor according to the present invention becomes flat. This results in the brushless motor of the present invention to be used easily. Furthermore, according to the brushless motor of the present invention, the distribution of the magnetic flux becomes to a curve similar to the sine wave, because the center portion of the magnetic pole in the circumferential direction of the permanent magnet becomes maximum in intensity, whereas the boaderline of N and S poles becomes minimum or zero in intensity, so that in the whole revolution range the osicllation and noise of the motor can be reduced.

Figure 8:
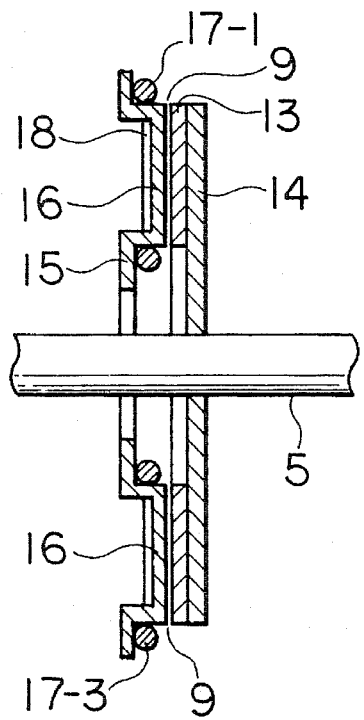
FIG. 8 is a vertically sectional side view of a brushless motor showing another embodiment of the present invention.

FIG. 8 shows an axial air gap type brushless motor showing another embodiment of the present invention. In this embodiment, an annular thin permanent magnet 13 is used instead of the cylindrical thin permanent magnet 10, a plarnar back yoke 14 mounted on the rotary shaft 5 and supporting the permanent magnet 13 is used instead of the back yoke 11, and a planar stator 15 is used instead of the cylindrical stator 1.

Figure 9:
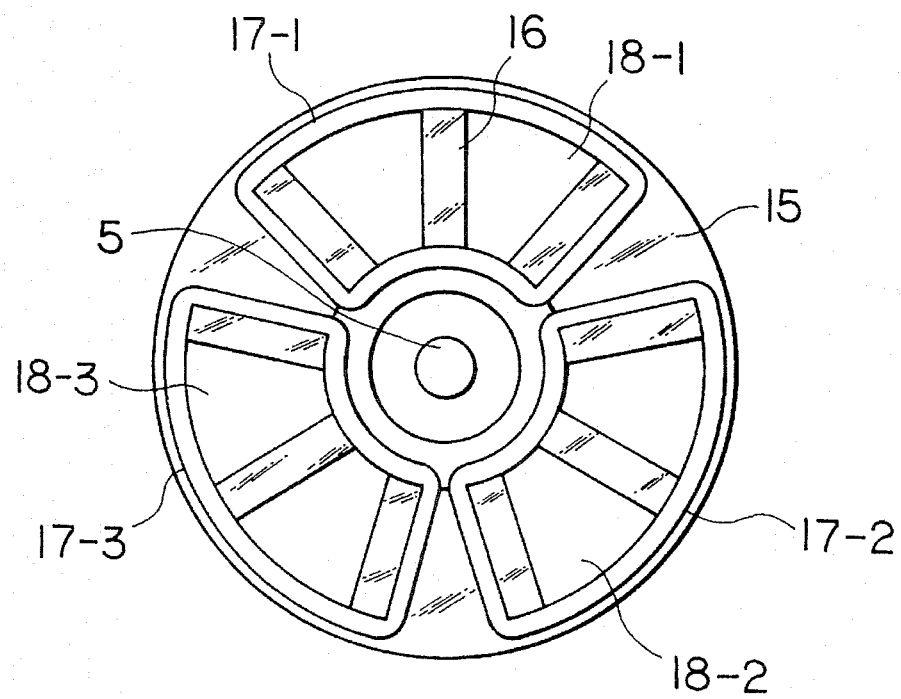
FIG. 9 is a front view explaining a stator of the brushless motor shown in FIG. 8.
Figure 11:
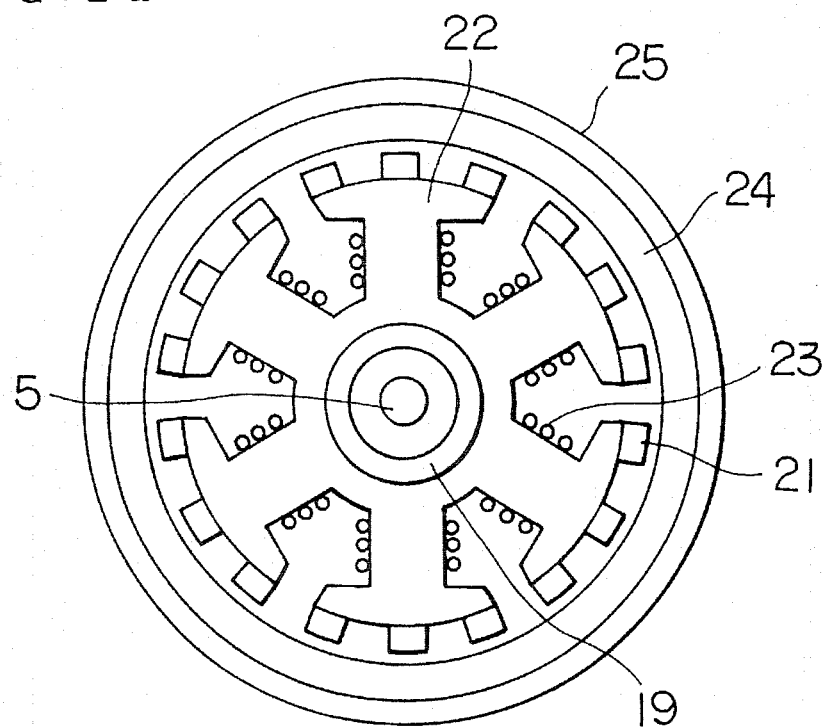
FIG. 11 is a front view of a brushless motor showing a further embodiment of the present invention.
Figure 12:
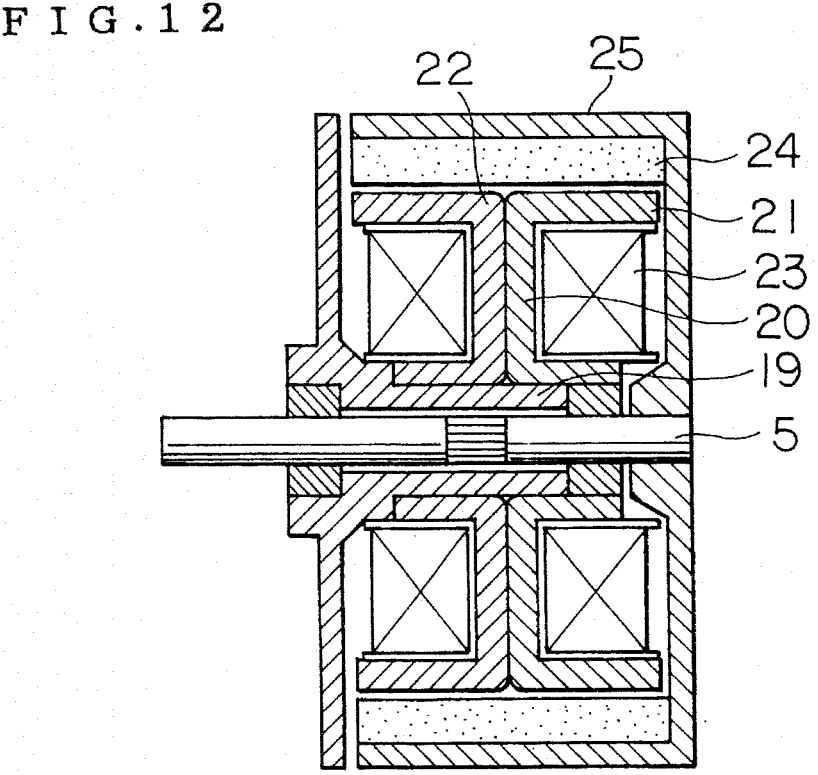
FIG. 12 is a vertically sectional side view of the brushless motor shown in FIG. 11.
Figure 13:
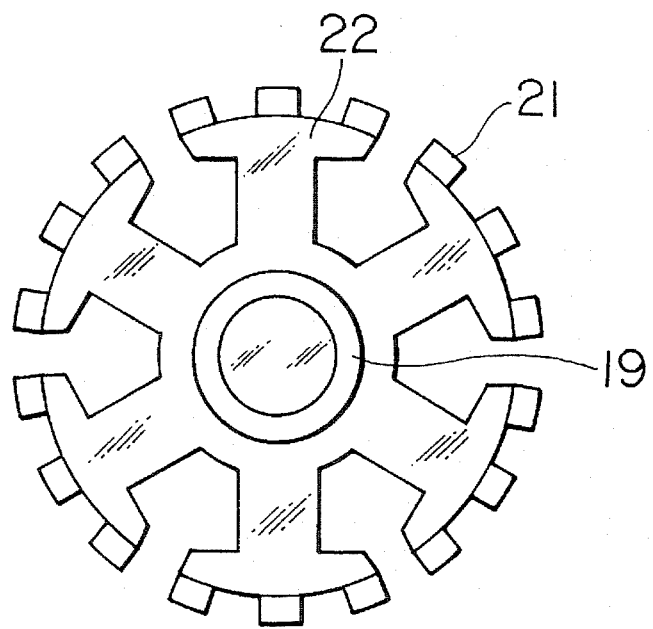
FIG. 13 is a front view of a stator of the brushless motor shown in FIG. 11.
Figure 14:
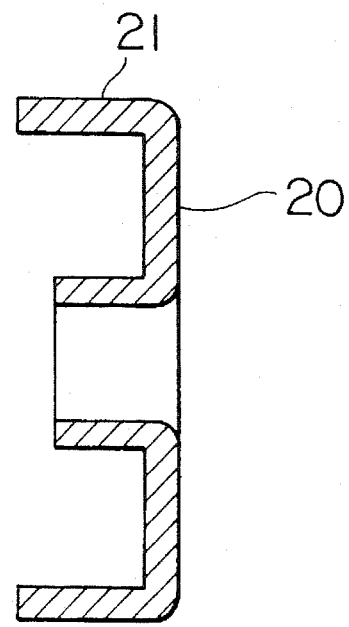
FIG. 14 is a vertically sectional side view of a stator magnetic pole of the brushless motor shown in FIG. 11.

As shown in FIG. 9, Z pieces of stator magnetic pole, for example, three stator magnetic poles 18-1, 18-2, 18-8 are provided on one side surface of said stator 15, separating from one another in the circumferential direction thereof. A plurality of elongated poles, for example, three elongated pole teeth 16 extending radially of the stator 15 and projecting axially of the rotary shaft 5 are formed by molding or sintering on one side surface of each of said stator magnetic poles 18. Said pole teeth 16 are faced to one side surface of said permanent magnet 13 through the air gap 9. Stator exciting windings 17-1, 17-2, 17-3 are wound around said stator magnetic poles 18-1, 18-2, 18-3, respectively.

On said one side surface of the permanent magnet 18 is magnetized so as to form in the circumferential direction thereof Z piece of N pole, for example, eight N poles and Z pieces of S pole, for example, eight S poles alternately with the same pitch.

The relation among Z, m and $Q_R$ is the same with that of the previous embodiment.

Further, portions of the stator magnetic pole 18 put between said elongated pole teeth 16 may be in the form of slits or holes. In the embodiment shown in FIGS. 8 and 9, the one side surface of said stator magnetic pole 18 is deviated a little in the axial direction from the one side surface of said stator 15, so that the exciting winding 17 can be wound therearound easily. If the amount of exciting winding 17 is small, said one side surface of the magnetic pole 18 can be in alignment with said one side surface of the stator 15.

In the present invention, it is economical when m is 1 (three poles). However, in such a case, a force is applied on the rotary shaft in the axial direction thereof and the force is moved in the rotary direction when the phase is changed and rotated, because the attractive and repulsion forces acting in the radial direction between the stator and the rotor (when the stator is magnetized by the direct current) are not cancelled, so that the oscillation becomes large. In case that m is not less than 2, no such force in the axial direction is applied, however, it is preferable that m is two, three or four, in view of the practical cost and performance, because the price of the motor is increased when the number of m is increased.

The present invention can be applied to the two-phase motor, four-phase motor or five-phase motor, similarly. However, in the commercially available tow-phase eight-pole motor, the magnetic path becomes long, because the magnetic path is formed by only the stator magnetic poles for one-phase and the entire peripheral length of the stator yoke is used. On the contrary, in the three-phase motor, the magnetic path becomes short and the driving circuit becomes simple, because the magnetic path can be formed by using the adjacent stator magnetic poles, and the three-terminal driving as the star connection or delta connection can be adopted.

FIGS. 11 to 14 show an outer-rotor permanent magnet type brushless motor of a further embodiment the present invention, wherein the rotor is positioned out side of the stator.

In FIGS. 11 to 14, reference numeral 19 denotes a cylindrical stator supported rotatably freely by the rotary shaft 5. Numeral 20 denotes stator magnetic poles each extending outwardly from the outer peripheral surface of said stator 19 in the radial direction thereof. 21 denotes a plurality of pole teeth provided on the tip of each of said stator magnetic poles 20. 22 denotes a stator leg formed by two of said stator magnetic poles 20 connected back to back with each other, and 23 denotes stator exciting windings each wound around each of the stator legs 22. 24 denotes a cylindrical permanent magnet of which inner peripheral surface faces to the outer peripheral surface of said pole teeth 21 of the stator magnetic poles 20 through an air gap, and 25 denotes a back yoke of magnetic material intimately attached to the outer peripheral surface of said permanent magnet 24. Said back yoke 25 is supported by said rotary shaft 5.

The function and effect of this embodiment are similar to that of the other embodiments.

The effects of the permanent magnet type brushless motor according to the present invention will be explained hereunder.

① Oscillation and noise can be reduced at whole revolution numbers.

② Unevenness of rotation becomes small.

③ Large torque and high output can be obtained at a higher revolution number.

④ The magnetic circuit is formed by the two-dimensional magnetic path along a plane normal to the axis of rotary shaft except a plane in the axial direction of the rotary shaft, so that the magnetic path becomes short, that the magnetic resistance becomes small, and that a high speed response can be obtained.

⑤ The area of the stator magnetic pole facing the rotary magnetic pole becomes twice that of the conventional hybrid type, so that a high efficiency can be obtained.

What is claimed is:

1. A permanent magnet type brushless motor comprising
    a cylindrical stator,
    3 m pieces of stator magnetic pole extending inwardly in the radial direction from the inner peripheral surface of said stator, m being an integer not less than 2, and each of said stator magnetic poles having a plurality of pole teeth on the tip thereof,
    stator exciting windings each wound around on each of the stator magnetic poles,
    a cylindrical permanent magnet facing the inner peripheral surfaces of said pole teeth of the stator magnetic poles with a gap therebetween, said permanent magnet having
        Z pieces of N pole and Z pieces of S pole magnetized alternately around the circumference thereof with the same pitch, where $Z=m(3n\pm1)$, and n is an integer not less than 2, and
        an angle formed between
            the center of an N pole of said permanent magnet, said N pole corresponding to a first pole tooth, said first pole tooth being at the center of a first one of said stator magnetic poles, and
            the center of an S pole of said permanent magnet, said S pole corresponding to a second pole tooth, the second pole tooth being at the center of a second one of said stator magnetic poles, said second one of said stator magnetic poles being adjacent to said first one of said stator magnetic poles,
        such that magnetic flux from said N pole of said permanent magnet is passed through said first one of said stator magnetic poles and returned to said S pole through said second one of said stator magnetic poles, said magnetic flux having a radial orientation as it passes through said N pole and said S pole of said permanent magnet,
        and such that the radial orientation of said magnetic flux through said stator magnetic poles alternates with each successive stator magnetic pole,
    a back yoke of magnetic material intimately attached on the inner peripheral surface of said permanent magnet, and
    a rotary shaft for supporting said back yoke.

2. The permanent magnet type brushless motor according to claim 1, wherein said angle is $360° (n\pm\frac{1}{2})/Z$.

3. The permanent magnet type brushless motor according to claim 1, wherein said m is 2, 3 or 4.

4. The permanent magnet type brushless motor according to claim 1, wherein said magnetic flux also passes through said back yoke and has a circumferential orientation when passing through said back yoke.

5. A permanent magnet type brushless motor comprising
    a planar stator,
    3m pieces of stator magnetic pole extending outwardly in the radial direction on said stator, m being an integer, and each of said stator magnetic poles having at one side surface thereof a plurality of pole teeth projected axially,
    stator exciting windings each wound around on each of the stator magnetic poles,
    an annular permanent magnet, one side surface of which is faced to side surfaces of said pole teeth of the stator magnetic poles with a gap therebetween, said permanent magnet having
        Z pieces of N pole and Z pieces of S pole magnetized alternately around the circumference thereof with the same pitch, where $Z=(3n\pm1)$, and n is an integer not less than 2, and
        an angle formed between
            the center of an N pole of said permanent magnet, said N pole corresponding to a first pole tooth, said first pole tooth being at the center of a first one of said stator magnetic poles, and
            the center of an S pole of said permanent magnet, said S pole corresponding to a second pole tooth, said second pole tooth being at the center of a second one of said stator magnetic poles, said second one of said stator magnetic poles being adjacent to said first one of said stator magnetic poles,
        such that magnetic flux from said N pole of said permanent magnet is passed through said stator magnetic pole corresponding to said N pole and returned to said S pole through said one of stator magnetic poles adjacent to said any one of the stator magnetic pole, said magnetic flux having a radial orientation as it passes through said N pole and said S pole of said permanent magnet,
        and such that the radial orientation of said magnetic flux through said stator magnetic poles alternates with each successive stator magnetic pole,
    a back yoke of magnetic material intimately attached on the other surface of said permanent magnet, and
    a rotary shaft for supporting said back yoke.

6. The permanent magnet type brushless motor according to claim 5, wherein said angle is $360° (n\pm\frac{1}{2})/Z$.

7. The permanent magnet type brushless motor according to claim 5, wherein said magnetic flux also passes through said back yoke and has a circumferential orientation when passing through said back yoke.

8. A permanent magnet type brushless motor comprising
    a cylindrical stator,
    3 m pieces of stator magnetic pole extending outwardly in the radial direction from the outer peripheral surface of said stator, m being an integer not less than 2, and each of said stator magnetic poles having a plurality of pole teeth on the tip thereof, two of said stator magnetic poles being connected back to back with each other to form a stator leg,
    stator exciting windings each wound around on each of the stator legs, a cylindrical permanent magnet facing the outer peripheral surface of said pole teeth of the stator magnetic poles with a gap therebetween, said permanent magnet having Z pieces of N pole and Z pieces of S pole magnetized alternately around the circumference thereof with the same pitch, where $Z=m(3n\pm1)$, and n is an integer not less than 2, and an angle formed between the center of an N pole of said permanent magnet, said N pole corresponding to a first pole tooth, said first pole tooth being at the center of a first one of said stator magnetic poles, and the center of an S pole of said permanent magnet, said S pole corresponding to a second pole tooth, said second pole tooth being at the center of a second one of said stator magnetic poles, said second one of said stator magnetic poles being adjacent to said first one of said stator magnetic poles, such that magnetic flux from said N pole of said permanent magnet is passed through said stator magnetic pole corresponding to said N pole and returned to said S pole through said one of the stator magnetic poles adjacent to said any one of the stator magnetic poles, said magnetic flux having a radial orientation as it passes through said N pole and said S pole of said permanent magnet, and such that the radial orientation of said magnetic flux through said stator magnetic poles alternates with each successive stator magnetic pole, a back yoke of magnetic material intimately attached on the outer peripheral surface of said permanent magnet, and a rotary shaft for supporting said back yoke.

9. The permanent magnet type brushless motor according to claim 8, wherein said angle is $360° (n\pm\frac{1}{2})/Z$.

10. The permanent magnet type brushless motor according to claim 8, wherein said m is 2, 3 or 4.

11. The permanent magnet type brushless motor according to claim 8, wherein said magnetic flux also passes through said back yoke and has a circumferential orientation when passing through said back yoke.

* * * * *